(12) United States Patent
Murugesu et al.

(10) Patent No.: US 8,077,665 B2
(45) Date of Patent: Dec. 13, 2011

(54) BANDWIDTH ALLOCATION IN A WIRELESS NETWORK

(75) Inventors: Gukhan Murugesu, Selangor (MY); Moh L Sim, Selangor (MY)

(73) Assignee: British Telecommunications plc, London (GB)

( * ) Notice: Subject to any disclaimer, the term of this patent is extended or adjusted under 35 U.S.C. 154(b) by 944 days.

(21) Appl. No.: 11/988,880

(22) PCT Filed: Jul. 20, 2006

(86) PCT No.: PCT/GB2006/002706
§ 371 (c)(1),
(2), (4) Date: Jan. 16, 2008

(87) PCT Pub. No.: WO2007/012819
PCT Pub. Date: Feb. 1, 2007

(65) Prior Publication Data
US 2009/0122751 A1  May 14, 2009

(30) Foreign Application Priority Data

Jul. 29, 2005 (MY) .............................. PI 20053527
Nov. 7, 2005 (EP) .................................... 05256889

(51) Int. Cl.
*H04W 4/00* (2009.01)
*G06F 15/173* (2006.01)

(52) U.S. Cl. ......................... 370/329; 709/235; 709/238

(58) Field of Classification Search ................... 370/329
See application file for complete search history.

(56) References Cited

U.S. PATENT DOCUMENTS

| 7,027,462 B2 * | 4/2006 | Benveniste | 370/447 |
| 7,085,284 B1 * | 8/2006 | Negus | 370/461 |
| 7,095,732 B1 * | 8/2006 | Watson, Jr. | 370/346 |
| 7,095,754 B2 * | 8/2006 | Benveniste | 370/465 |
| 7,248,604 B2 * | 7/2007 | Sugar et al. | 370/468 |
| 7,266,085 B2 * | 9/2007 | Stine | 370/252 |
| 7,286,551 B2 * | 10/2007 | Park et al. | 370/412 |
| 7,292,598 B2 * | 11/2007 | Ho et al. | 370/461 |
| 7,376,143 B2 * | 5/2008 | Liu | 370/448 |
| 7,388,833 B2 * | 6/2008 | Yuan et al. | 370/230.1 |

(Continued)

FOREIGN PATENT DOCUMENTS

EP  1 255 376  11/2002

(Continued)

OTHER PUBLICATIONS

International Search Report for PCT/GB2006/002706 mailed Oct. 31, 2006.

(Continued)

*Primary Examiner* — Andrew Caldwell
*Assistant Examiner* — Melvin H Pollack
(74) *Attorney, Agent, or Firm* — Nixon & Vanderhye PC

(57) ABSTRACT

A contention window for allocating bandwidth in a wireless network is determined. A plurality of nodes includes at least a first and a second router and at least one client connected to each of the first and second routers. Information is received at the first router from the other nodes, the information relating to the condition of the other nodes. A contention window is calculated for the first router based on the received information and the delay is set for a retransmission of data by the first router to the calculated contention window following an unsuccessful transmission of the data.

9 Claims, 6 Drawing Sheets

U.S. PATENT DOCUMENTS

| | | | |
|---|---|---|---|
| 7,515,608 B2 * | 4/2009 | Yuan et al. ............ | 370/468 |
| 7,522,552 B2 * | 4/2009 | Fein et al. ............ | 370/328 |
| 7,525,915 B2 * | 4/2009 | Zaki et al. ............ | 370/235 |
| 7,602,707 B2 * | 10/2009 | Guo et al. ............ | 370/229 |
| 7,613,153 B2 * | 11/2009 | Chandra et al. ........ | 370/338 |
| 7,623,542 B2 * | 11/2009 | Yonge et al. .......... | 370/445 |
| 7,626,931 B2 * | 12/2009 | Wu et al. ............. | 370/232 |
| 7,660,285 B2 * | 2/2010 | Xiong et al. .......... | 370/338 |
| 7,801,063 B2 * | 9/2010 | Hiddink et al. ........ | 370/310 |
| 7,826,438 B1 * | 11/2010 | Salhotra et al. ....... | 370/345 |
| 2003/0081628 A1 | 5/2003 | Sugar et al. | |
| 2004/0093421 A1 | 5/2004 | Peng et al. | |
| 2006/0062189 A1 * | 3/2006 | Takeuchi ............ | 370/338 |
| 2006/0153117 A1 * | 7/2006 | Bichot et al. ........ | 370/316 |

FOREIGN PATENT DOCUMENTS

| | | |
|---|---|---|
| EP | 1 255 376 A1 | 11/2002 |
| GB | 2 419 497 | 4/2006 |

OTHER PUBLICATIONS

Fang, Z. et al., "Performance Evaluation of a Fair Backoff Algorithm for IEEE 802.11 DFWMAC," MOBIHOC '02, Jun. 9-11, 2002, EPFL Lausanne, Switzerland, Copyright 2002 ACM 1-58113-501-7/02/0006.

Li, Baochun, "End-to-End Fair Bandwith Allocation in Multi-hop Wireless Ad Hoc Networks," ICDCS archive Proceedings of the 25th IEEE International Conference on Distributed Computing Systems, 2005, pp. 471-480, ISBN~ISSN:1063-6927, 0-7695-2331-5, IEEE Computer Society Washington, DC, USA.

* cited by examiner

BANDWIDTH ALLOCATION IN A WIRELESS NETWORK

This application is the U.S. national phase of International Application No. PCT/GB2006/002706 filed 20 Jul. 2006 which designated the U.S. and claims priority to Malaysian Patent Application No. PI20053527 filed 29 Jul. 2005 and European Patent Application No. 05256889.6 filed 7 Nov. 2005, the entire contents of each of which are hereby incorporated by reference.

FIELD OF THE INVENTION

This invention relates to a method of allocating bandwidth in a wireless network, in particular a method of fairly allocating bandwidth by dynamically calculating the contention windows used by routers in a wireless mesh network.

BACKGROUND TO THE INVENTION

Telecommunications networks are commonplace today and typically operate in accordance with a given standard or specification. These standards ensure interoperability between telecommunications devices and are defined by organisations such as the, Internet Engineering Task Force (IETF), Wireless Ethernet Compatibility Alliance (WECA), and the International Telecommunication Union (ITU).

As with wired networks, wireless networks can be classified into different types based on the coverage area. These include wireless wide area networks (WWAN), wireless metropolitan area networks (WMANs) and wireless local area networks (WLANs).

WLAN technologies enable users to establish wireless connections within a local area, for example, within a user's house, a corporate building or in a public space, such as an airport. In 1997, the IEEE approved the 802.11 standard for WLANs. The IEEE802.11 standard is commonly referred to as Wi-Fi and has been rapidly deployed across the globe since its inception as an alternative to traditional wired network solutions. The introduction of Wi-Fi has revolutionised wireless networking and has been further developed with the introduction of Wireless Mesh Network (WMN).

A typical WMN consists of multiple nodes connected in a mesh topology. The nodes can be wireless routers, also known as access points (APs), or wireless clients. In a mesh topology, the nodes in the network have redundant or multiple communication paths with its destination node. The routers usually have limited mobility and form the infrastructure or backbone of the WMN. In contrast, the clients are not usually limited to being stationary. Both the clients and the routers can organise and configure themselves autonomously to interconnect wirelessly to form the mesh structure, often creating redundant communication paths, which is an inherent characteristic of the mesh topology. The mesh topology makes the WMN particularly resilient and robust towards interference, failing nodes and congestion, as well as being highly scalable due to its ability to autonomously configure and organise connecting nodes. The radio technology widely employed in most WiFi networks, such as WMN, utilises a single radio.

Mesh networks are highly scalable, hence adding nodes to a particular network is easy as the physical location of the node that is being added is immaterial. The node can be placed anywhere within the network's communication range, and it will automatically configure itself and connect to the nearest node in order to communicate with its destination node. While the location of the node is immaterial, the node might have to utilise several hops in order to communicate with its destination. The number of hops taken is dependent on the location of the node and the corresponding location of the destination node.

The medium access control (MAC) layer/algorithm normally determines how network capacity is allocated to clients. In a conventional Wi-Fi router, the MAC layer will control the admission of a particular set of clients and control allocation of bandwidth among all clients connected to the router. Presently, a router allocates a predetermined amount of bandwidth to each client, which is determined by the total capacity of the network. However, problems arise in wireless mesh networks where there are multiple interconnected routers, each with separate clients attached to them. The situation is described below with reference to FIG. 1.

FIG. 1 illustrates a wireless network 100 in a multihop scenario. The network 100 comprises a bandwidth source or sink 102, a gateway 104, and router 106. The gateway 104 is connected to the sink 102 and the router 106. The gateway 104 is also connected to a client (client1) 108. The router 106 is connected to two clients, client2 110 and client3 112.

In known arrangements, both the gateway 104 and the router 106 are allocated the same bandwidth. Whilst this may appear to be fair, gateway 104, and indeed any other router, treats all nodes connected equally as clients. Therefore, gateway 104 treats the router 106 as another client and only allocates the connection between the gateway 104 and the router 106 the same bandwidth as the connection between the gateway 104 and client1 108. Thus, router 106 only has the same bandwidth allocation as client1 108, and has to share this allocated bandwidth with its two clients, client and client. The result is that bandwidth in the network is biased in favour of those nodes that are nearest, in the sense that they are the separated by the fewest hops, to the gateway or bandwidth source. The problem is therefore to provide a fair allocation of bandwidth across all nodes in a wireless network, irrespective of their physical location in the network.

This problem is regularly observed in multihop scenarios such as the one described above. However, as multihop scenarios are ubiquitous in WMN, the same problem also exists in WMNs.

Most current routing implementations in WMNs utilise ad-hoc routing protocols, such as ad-hoc on demand distance vector routing (AODV) and dynamic source routing (DSR), based on the notion that ad-hoc networks are very similar to WMNs. However, this ignores the fact that a WMN consists of mesh routers, which act as relaying nodes and APs. The requirements of the mesh routers are different as compared to the requirements of the mesh clients. Clients in ad-hoc networks are similar to the mesh clients but not to the mesh routers. Therefore, conventional ad-hoc routing protocols cannot efficiently provide a framework for fair distribution of bandwidth in a WMN. Furthermore, the MAC extension provided by 802.11e for QoS does not cater for this problem.

In "Providing Throughput Guarantees in IEEE 802.11e Wireless LANs" by Albert Banchs et al., Proceedings of the 18$^{th}$ International Teletraffic Congress (ITC-18), Berlin, Germany, Sep. 1-05, 2003, there is described a method for improving the throughput (bandwidth) guarantees in the 802.11e EDCF mechanism based on deducing new contention window sizes. The method enables an access point to provide throughput guarantees and admit as many clients as possible based on those guarantees. However, the method is only concerned with bandwidth aggregation between an access point and its clients and does not consider bandwidth aggregation between access points. Furthermore, the method described does not allocate bandwidth fairly and evenly between all clients. Instead it merely allows a single router to maximise the number of clients it can have connected and provides some throughput guarantees.

SUMMARY

It is the aim of embodiments of the present invention to address one or more of the above-stated problems.

According to one aspect of the present invention, there is provided a method of determining a contention window for allocating bandwidth in a wireless network comprising a plurality of nodes, said nodes comprising at least a first and a second router and at least one client connected to each of said first and second routers, the method comprising the steps of receiving information at the first router from the other nodes, said information relating to the condition of the other nodes; calculating a contention window for said first router based on the received information; and setting the delay for a retransmission of data by the first router to the calculated contention window, wherein the retransmission of data follows an unsuccessful transmission of said data.

Preferably, the network further comprises a bandwidth source, and the calculated contention window is larger if the first router is close to the bandwidth source, and the contention window is smaller if the router is further away from the bandwidth source.

Preferably, the closer the router is to the gateway, the fewer the number of hops between the router and the gateway.

Therefore, a precise contention window is calculated and used to access the wireless medium instead of a random selection from a range. Since the contention window is dynamically altered based on the condition of its neighbours using information passed through control channels, the probability of a collision during transmission is minimised and a more structured medium contention is enabled, resulting in a fairer bandwidth allocation.

The information received from the second router may be at least one of: the total number of hops in the network, the total number of clients connected to the second router, the requested throughput of each client connected to the second router, and the number of hops between the first router and the second router.

Preferably, the information received from a client comprises the requested throughput of said client.

The contention window may be inversely proportional to $\beta_{i,k+1}$, where $\beta_{i,k+1}$ is given by $$\beta_{i,k+1} = \frac{\beta_{i,k+1}}{B_0} = \frac{\sum_{m=k+1}^{L}(m+1)\sum_{i=1}^{n_{i,m}}\lfloor G_{mi}, B_o \rfloor}{B_o}$$

wherein:
m is the number of hops away from the first router;
L is the total number of hops in the network;
k+1 is the number of hops the first router is from a gateway in the network;
i is the client number;
$n_{i,m}$ is the total number of clients at m hops away;
$G_{m,i}$ is the requested throughput by client i at m hops away; and
$B_0$ is the throughput at a client.

Preferably, the contention window is given by $CW_{i,k+1}$ which can be represented as:

$$CW_{i,k+1} = \frac{CW_o + 1}{\beta_{i,k+1}} - 1$$

wherein $CW_0$ is the minimum contention window for each of the clients.

The contention window may be periodically recalculated by the first router or alternatively, the contention window may be calculated only once during the set-up of the network or when a new node is added.

The clients typically use a different contention window to the calculated contention window, and the contention window used by the clients is usually fixed.

The network may be a multihop mesh network.

In a second embodiment of the present invention, there is provided a wireless network comprising a plurality of nodes, said nodes comprising at least a first and a second router and at least one client connected to each of said first and second routers, wherein the first router is adapted to: receive information from the other nodes, said information relating to the condition of the other nodes; calculate a contention window for said first router based on the received information; and set the delay for a retransmission of data by the first router to the calculated contention window, wherein the retransmission of data follows an unsuccessful transmission of said data.

Advantageously, in embodiments of the invention, bandwidth is allocated in a fair manner by providing equal access to the wireless medium irrespective of position/location from the gateway.

Furthermore, changes or modifications are only required with the access points or routers and not the clients. Therefore, it is easily employed in current networks.

Embodiments of the present invention are based on an exchange of information between wireless routers for decision making of the medium access control. Conventional Wi-Fi network layer protocol using AODV or DSR does not support the exchange of information among the wireless routers/access points for co-ordination in making admission decisions.

The methods provide a compromise between high throughput and fairness. Fairness simply means equal bandwidth allocation to all clients irrespective of their position in relation to the bandwidth source/gateway.

This mechanism can be used at hotspots to extend the coverage using multihop or mesh network while maintaining acceptable bandwidth for clients located far away from the gateway.

BRIEF DESCRIPTION OF THE DRAWINGS

For a better understanding of the present invention reference will now be made by way of example only to the accompanying drawings, in which.

DESCRIPTION OF PREFERRED EMBODIMENTS

Figure 1:
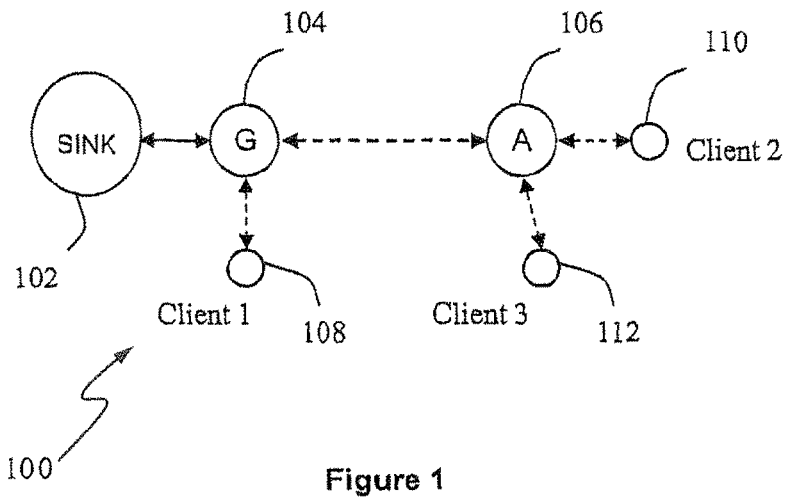
FIG. 1 is a schematic diagram of a multihop scenario.

The present invention is described herein with reference to particular examples. The invention is not, however, limited to such examples.

The bandwidth or throughput that a device under 802.11 protocols has depends in part on the 'contention window' or 'back-off window'. The contention window (CW) is part of the waiting period between data frame transmissions at a device, which is used to keep transmissions from colliding with each other. The contention window is divided into consecutively numbered slots, with the number of slots always being 1 less than a power of 2 (e.g. 15, 31, 63, etc). When a node wants to transmit a frame of data, it randomly selects a slot number from the range of $(0, CW_{min})$, where $CW_{min}$ is referred to as the minimum contention window, which is a constant corresponding to the upper limit of the range from which the initial back-off time is selected. The node then counts up to the selected slot number before transmitting the frame. If the node does not receive an acknowledgement that the frame was successfully received, it assumes that the transmission failed. The node then initiates a retry counter, which selects the next slot in the contention window range (the next power of 2 minus 1).

The maximum contention window size is dependent on total bandwidth or throughput available in the network. A small contention window means that the retry counter will generally be lower, which in turn means that there will generally be less time between retransmissions. Therefore, a node operating with a small contention window can access the wireless medium faster than a node with a large contention window. If the node can access the medium faster than other nodes, it will generally be able to transmit faster than other nodes, hence the rate at which data can be transmitted in the network will be faster. This rate of data transfer often termed as data rate transfer and expressed in bits per second (bps), corresponding to the bandwidth of the node. In short, allocating a node a small contention window will effectively result in a high bandwidth allocation, whereas a allocating a node a large contention window will effectively result in a low bandwidth allocation.

Consequently, by adjusting the contention window used by a device as described in embodiments of the present invention, it is possible to adjust the effective bandwidth allocated to that device.

In conventional implementations of Wi-Fi, all nodes connected to a router would contend for the wireless medium independently. Thus, all nodes connected to the router will have the same probability of accessing the wireless medium. However, as described above, we would like the nodes that are actually routers connected to the router in question to have a higher probability of accessing the wireless medium, and hence effectively a higher bandwidth allocation.

In embodiments of the present invention, the control of throughput allocation at a router is achieved by using different minimum contention windows for clients and for routers.

Figure 2:
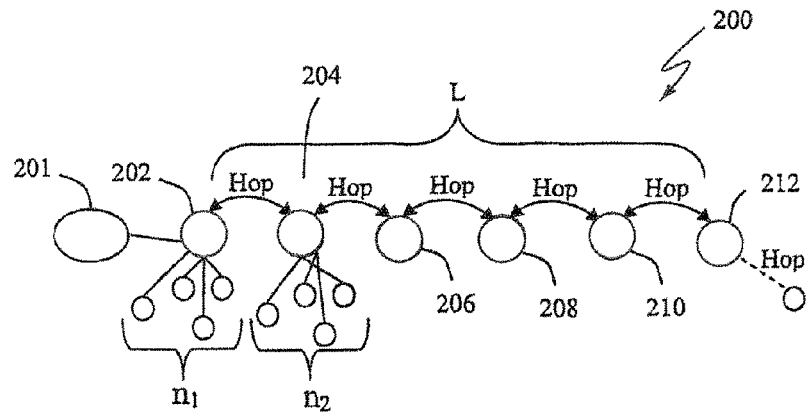
FIG. 2 is a schematic diagram of a multihop scenario in an embodiment of the present invention.

FIG. 2 illustrates a multihop network 200 in an embodiment of the present invention. The network 200 comprises a series of interconnected routers 202, 204, 206, 208, 210, and 212, with multiple clients connected to each of those routers.

The first router 202, which can also be considered as the gateway, is connected directly to a bandwidth source or sink 201. The total number of clients connected to the first router 202 is given by $n_1$. The total number of clients connected to the second router 204 is given by $n_2$, and so on. The total number of backhaul hops, L, in this example is 5.

In network 200, all the clients in the network operate with a common minimum contention window, $CW_0$ in the manner described above. The minimum contention windows that would be used for communications between routers can be calculated in two ways. In a centralised case, a central node, such as gateway 202, can calculate the minimum contention windows for the routers based on information received via a control channel from the various nodes in the network. These minimum contention windows are then broadcast to and utilised by the routers, and are ignored by the clients, which use a constant $CW_0$. In a distributed case, each individual router will calculate its own minimum contention window based on the information received via the control channel.

In both cases, the minimum contention window for the routers is calculated using the methods set out below in accordance with an embodiment of the present invention.

In order to modify the minimum contention window, each router in the network 200 exchanges information with every other router periodically, and uses this information to calculate a modified contention window that will ensure fair bandwidth allocation. The following information may be exchanged between the routers:

Number of clients and routers, $n_k$, at k hops away

Figure 3:
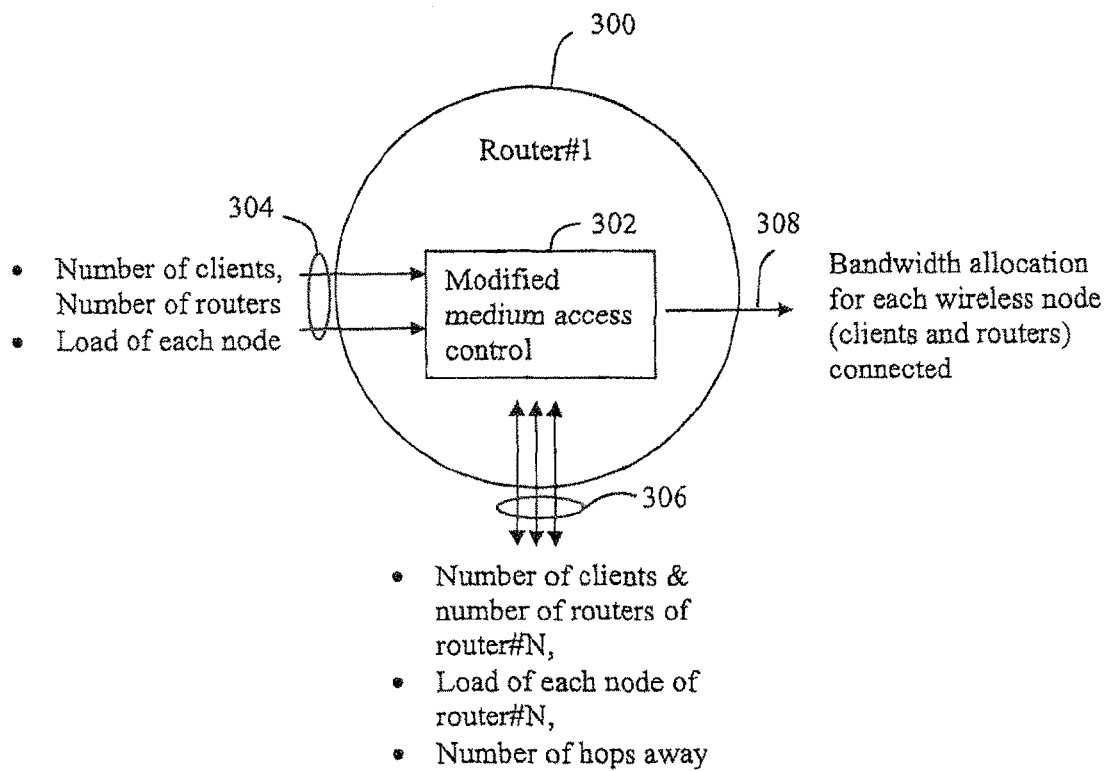
FIG. 3 is a diagram illustrating the information exchange at a router in an embodiment of the present invention.

Offered load, i.e., the amount of bandwidth requested by an application, $G_{kj}$, of client j, at k hops away The total number of backhaul hops, L The exchange of information is illustrated in FIG. 3, which shows a router 300 with a modified medium access control layer 302 communicating with other nodes, such as routers and clients, connected to the router. Information 304, 306 is periodically exchanged between the router 300 and the other nodes. This information 304, as described above, includes the total number of clients and routers connected to router 300, the load of each client or router connected to router 300 and the number of hops away of each of those nodes. The router 300 also exchanges this information 306 with other routers, so that information on all routers in available at every other router. The router 300 also transmits information 308 comprising the bandwidth allocation for each node connected to that router 300. The router 300 uses the information received to determine a bandwidth allocation for each node connected to it based on the method described herein below. The information may be exchanged via a control channel between the routers.

Figure 4:
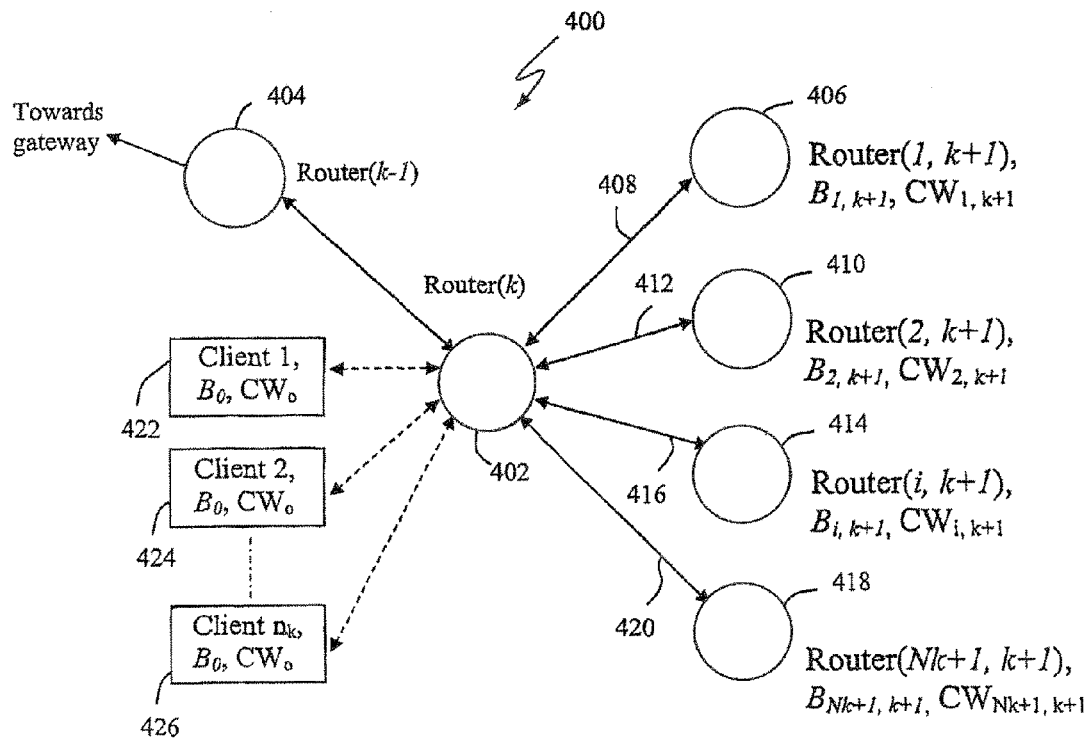
FIG. 4 is a diagram illustrating a series of interconnected routers and clients in an embodiment of the present invention.

FIG. 4 illustrates a more complex multihop network 400 with multiple interconnected routers and clients. The network 400 comprises a router, Router(k) 402, connected to a series of other routers, Router(k−1) 404, Router(1,k+1) 406, Router (2,k+1) 410, Router(i,k+1) and Router($N_{k+1}$, k+1) 418. The connection from Router(k) 402 to Router(k−1) 404 is towards a gateway or bandwidth source. Router(k) is connected to Router(1,k+1) via branch, to Router(2,k+1) via branch, to Router(i,k+1) via branchi 416, and to Router($N_{k+1}$,k+1) via branch($N_{k+1}$) 420. Router(k) 402 is also connected to a number of clients, Client, Client and Client($n_k$) 426. Each client has a total throughput represented by $B_0$, which is proportional to the average bandwidth allocated for the connection to the router and a default minimum contention window ($CW_{min}$) of $CW_o$. Each client then utilises the common mechanism described earlier to access the wireless medium using this minimum contention window.

On the other hand, each router has an average bandwidth allocation B and minimum contention window, which may differ between the routers and which are calculated in dependence on the information received from the other nodes in the network. Router(1,k+9) 406 has a bandwidth allocation of $B_{1,k+1}$ and a minimum contention window of $CW_{1,k+1}$. Router (2,k+1) 410 has a bandwidth allocation of $B_{k+1}$ and a minimum contention window of $CW_{2,k+1}$. Router(i,k+1) has a bandwidth allocation of $B_{i,k+1}$ and a minimum contention window of $CW_{i,k+1}$. Router($N_{k+1,k+1}$) 418 has a bandwidth allocation of $B_{Nk+1,k+1}$ and a minimum contention window of $CW_{Nk+1,k+1}$.

Figure 5:
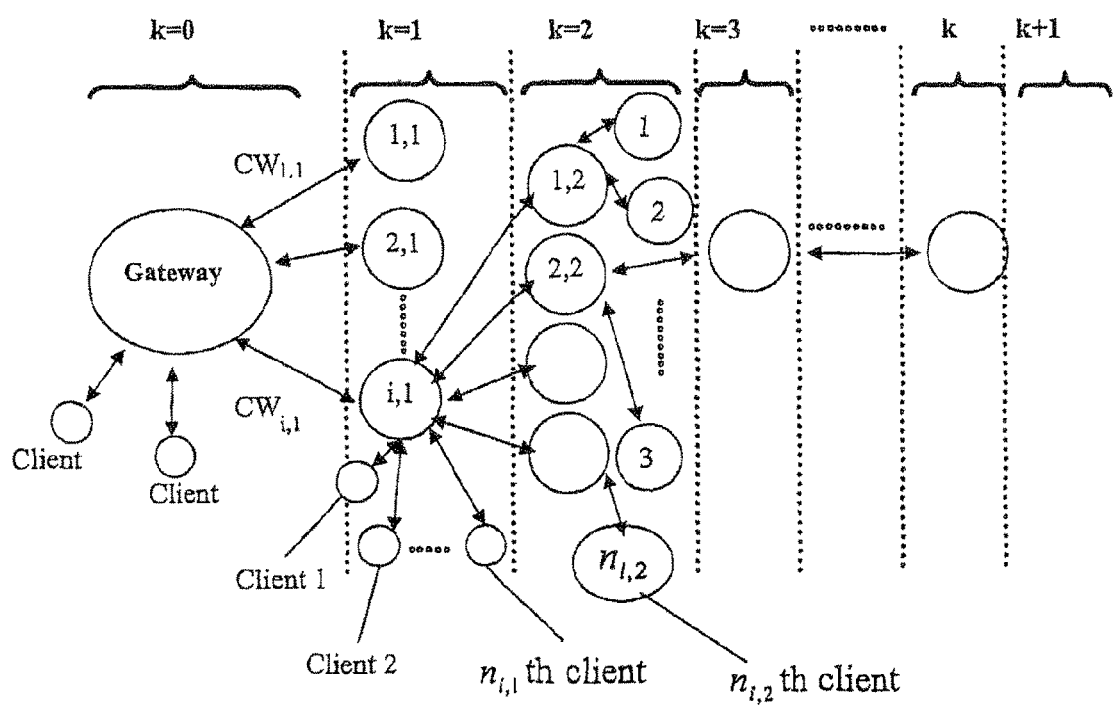
FIG. 5 is a diagram illustrating a hierarchy of routers and clients in an embodiment of the present invention.

A further example of router connections with other routers and clients and the way in which these elements are represented is illustrated in FIG. 5. In FIG. 5 routers are located k hops away from gateway, where the gateway is at k=0. Routers at k=1 hop away, are referred to as router(i,1), where i is a whole number starting at 1. Routers at k=2 are referred to as router(i, 2). Thus, the third router at k=2, may be referred to as router(3,2). Similarly, the total number of clients at k=1, is referred to as $n_{i,1}$.

In order to determine the minimum contention window for each router in a manner that ensures fair bandwidth allocation, equation (1) below must first be solved for a minimum $B_0$:

$$\sum_{k=0}^{L}(k+1)\sum_{j=1}^{n_k}\lfloor G_{kj}, B_o \rfloor = B_{max} \quad (1)$$

In equation (1):
k=number of hops away from the router in question
$n_k$=total number of clients at k hops away
$G_{kj}$=requested load or throughput by client j at k hops away
$B_{max}$=maximum achievable throughput, which for example is about 6 Mbps for IEEE802.11b
$\lfloor x,y \rfloor$ is defined as taking the smaller value between x and y The derivation of equation (1) is based on the fact that the time/bandwidth required for a packet to travel from a client at k hops away from the gateway is equal to $(k+1)B_0$, (k+1) is the number of hops a packet has to travel in which k hops through the router nodes and 1 hop between client and router. However, if the client transmits at less than $B_0$, say $G_{kj}$, the time taken would be smaller, i.e. $\lfloor G_{kj}, B_o \rfloor$ If there are $n_k$ clients in a sub-branch, then the time taken must be summed up, hence the second summation representing the sum of time taken by all $n_k$ users at k hops away.

When the information of client load $G_{kj}$ is not available, we can approximate $B_0$ by equation (2):

$$B_o = \frac{B_{max}}{\sum_{k=0}^{L}(k+1)n_k} \quad (2)$$

Referring now to FIG. 5, the subscript i is used to identify all the nodes which have a connection to the i branch as depicted in FIG. 5. $n_{i,k}$ is the total number of clients connected to all the mesh routers of branch i at k hops away from the gateway. For example, $n_{i,l}$ corresponds to total number of clients connected to the router of branch i which is 1 hop away from the gateway as depicted in FIG. 5. So $n_{i,2}$ corresponds to total number of clients connected to all the routers of branch i and all its subbranches which are 2 hops away from the gateway as depicted in FIG. 5.

Now, the ratio of throughput between any two given nodes i and j can be represented by:

$$\frac{B_i}{B_j} = \frac{\tau_i}{\tau_j} \quad (3)$$

where the probability of node i transmitting is $\tau_i$, given by:

$$\tau_i = \frac{2}{CW_i + 1} \quad (4)$$

Thus, substituting equation (4) into (3), results in:

$$\frac{B_i}{B_j} = \frac{CW_j + 1}{CW_i + 1} = \beta \quad (5)$$

Equation (5) can be rewritten with the minimum contention window of node i as the subject:

$$CW_i = \left(\frac{B_i}{B_j}\right)(CW_j + 1) - 1 \quad (6)$$

Thus $$CW_i = \frac{CW_j + 1}{\beta} - 1 \quad (7)$$

where $$\beta = \frac{B_i}{B_j} \quad (8)$$

Now starting from equation (7), we can substitute $CW_i$ with the more general notation introduced earlier for multiple branched routers. Therefore, the minimum contention window $CW_{i,k+1}$ used by router(i,k+1) for communicating with router(k) can be represented by equation (9) below:

$$CW_{i,k+1} = \frac{CW_o + 1}{\beta_{i,k+1}} - 1 \quad (9)$$

where $CW_o$ is the prefixed value for the minimum contention window, $CW_{min}$, used by all the clients.
Where $\beta_{i,k+1}$ is given by equation (10) below:

$$\beta_{i,k+1} = \frac{B_{i,k+1}}{B_0} = \frac{\sum_{m=k+1}^{L}(m+1)\sum_{i=1}^{n_{i,m}}\lfloor G_{mi}, B_o \rfloor}{B_o} \quad (10)$$

Where $B_{i,k+1}$ is proportional to the average time allocated for communication between router (k) and router (i,k+1). For a router that is at k hops away from gateway, the time that needs to be allocated to its i-th sub-branch in the next hop (k+1) is similar to equation (1), but only summing from k+1 hops down, resulting in equation (10).

In the event when the information of load of user i at m hops away from gateway $G_{mi}$, is not available, we can approximate $\beta_{i,k+1}$ using equation (11):

$$\beta_{i,k+1} \approx \sum_{m=k+1}^{L} (m+1)n_{i,m} \quad (11)$$

In IEEE802.11, the wireless medium may be accessed via a polling mechanism (Point Coordination Function, PCF) or contention mechanism (Distributed Coordination Function, DCF). In embodiments of the present invention, DCF is used. In DCF, all nodes contend for access to the wireless medium. The parameter that governs this contention is the contention window.

Figure 6:
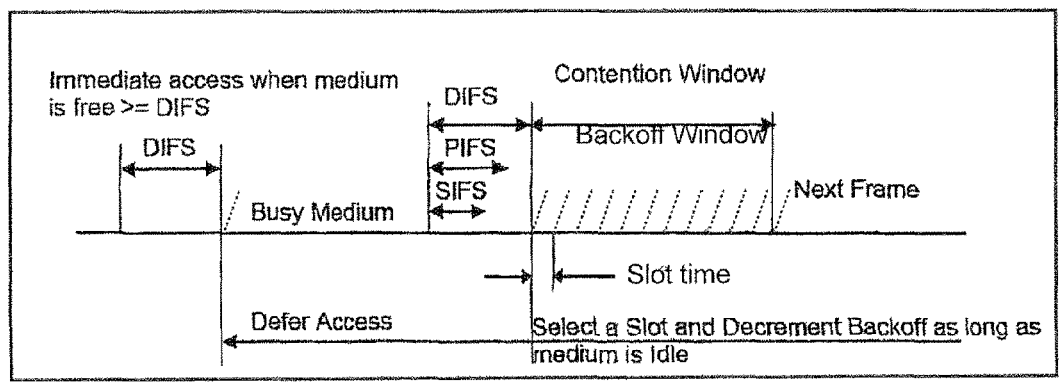
FIG. 6 is a diagram of how contention windows are used to access a wireless medium.

Referring to FIG. 6, which illustrates a DCF basic access method in the MAC, the DCF protocol on each node starts by listening on the channel (wireless medium). If the channel is idle for at least a DIFS (DCF Inter Frame Space), it sends the first packet in the transmit queue. If the channel is busy, the station starts the contention by selecting a random slot time from the contention window. Once this time expires and the channel is still idle, the station transmits. This is how known DCF MAC works.

In embodiments of the present invention, as with known the DCF protocol, each node listens to the channel. However, as illustrated in step 700 of FIG. 7, in embodiments of the present invention, a control channel is utilised by the routers to receive information such as the number of clients, number of hops and load of the clients from neighbouring nodes. This information is then used to derive the β function as shown in equations (10) and (11) above in step 702. This value of β is then used to modify the contention window used by a router in step 704 and as shown by the other equations above, and specifically by equation (9). This modified contention window is then fed back into the DCF mechanism, and replaces the random selection of slot time from the contention window by the standard DCF protocol. Therefore, the newly calculated contention windows for each router entirely replace the random slots chosen from the old contention window range in the past. Thus, the retry times for retransmission at a router is fixed until a new contention window is calculated based on the changing network conditions. Alternatively, the retry time may be doubled from this initial value set by the newly calculated contention window every time retransmission fails.

The implementation would be done at the routers only, making it transparent to the end users (the clients). The MAC at the client equipment would be preserved during implementation to ensure compatibility.

The above examples have been described with reference to a multihop scenario. However, a person skilled in the art will appreciate that the methods can clearly be extended to mesh topologies, such as WMN.

Figure 7:
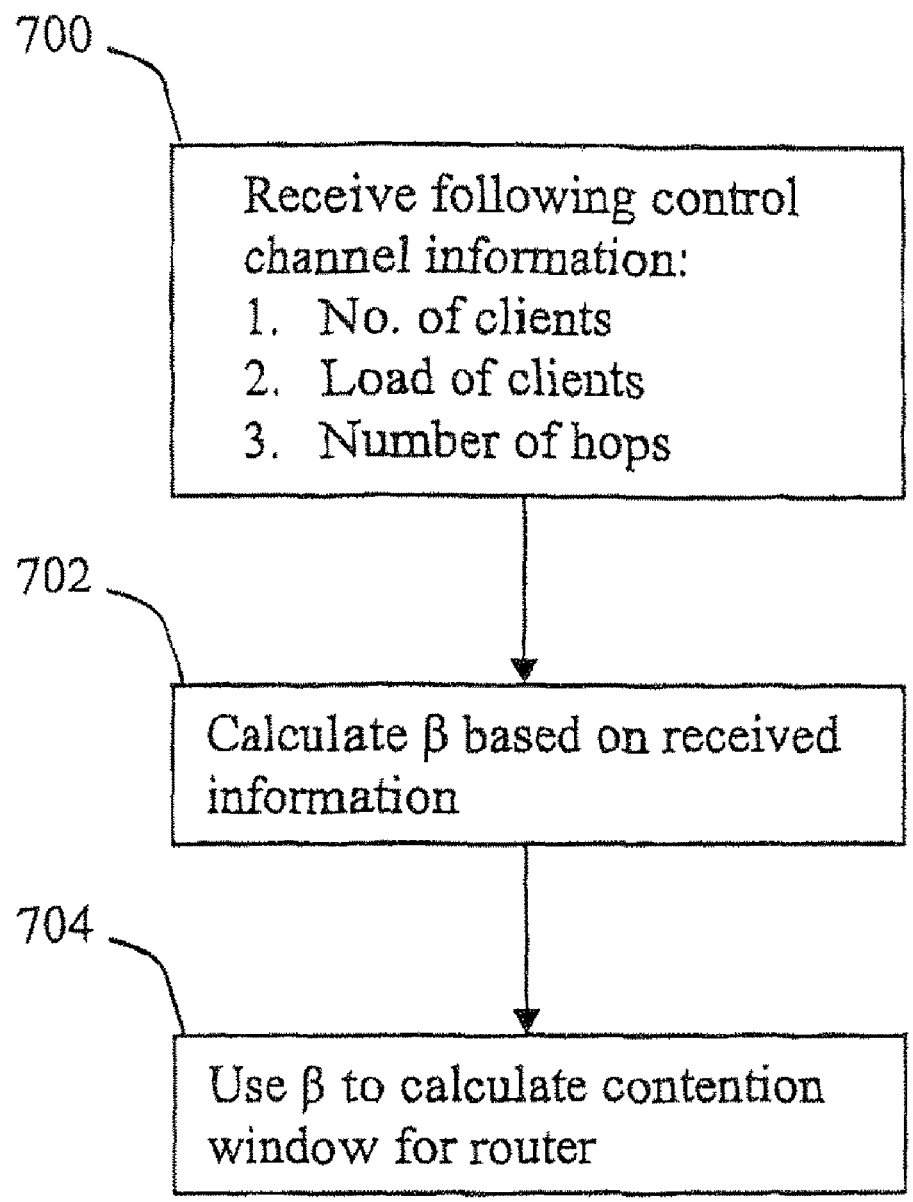
FIG. 7 is a flow diagram illustrating the method of calculating contention windows based on control channel information.
Figure 8:
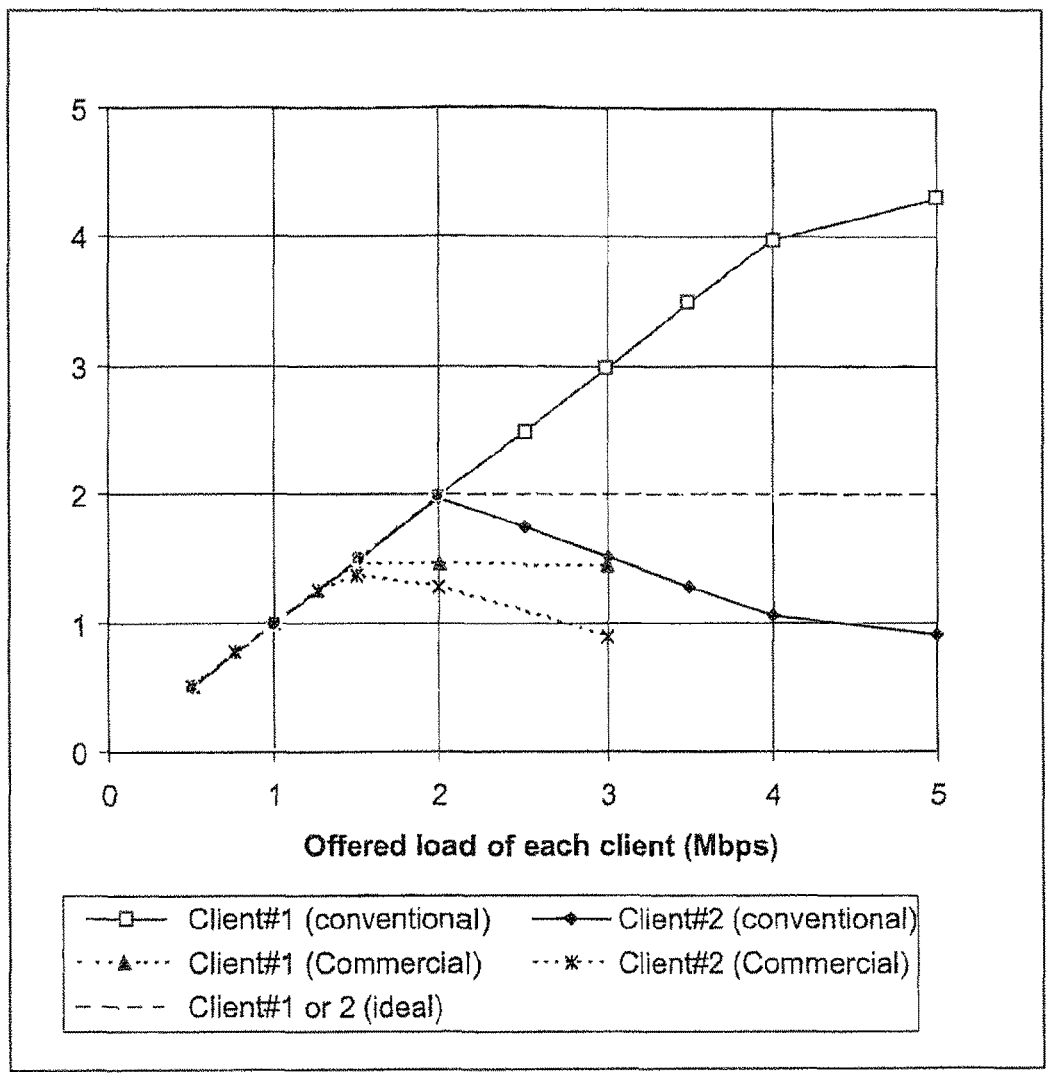
FIG. 8 is a graph illustrating the results of experiments based on the scenario depicted in FIG. 1.

FIG. 7 shows a comparison of bandwidth distribution performance in a typical commercial solution, a conventional AODV routing solution and an ideal multihop network. The ideal network here is defined as a network that provides fair allocation of bandwidth among all clients. With an ideal bandwidth sharing scheme, a maximum 2 Mbps per client is predicted. In contrast, the maximum throughput per client achieved by a typical commercial solution is only about 1.5 Mbps. Embodiments of the present invention offer a solution that is closer to the ideal than other presently known solutions.

It is noted herein that while the above describes examples of the invention, there are several variations and modifications which may be made to the described examples without departing from the scope of the present invention as defined in the appended claims. One skilled in the art will recognise modifications to the described examples.

What is claimed is:

1. A method of determining a contention window for allocating bandwidth in a wireless network comprising a plurality of nodes, said nodes comprising a plurality of routers and at least one client connected to each of said routers, the network further comprising a bandwidth source, the method comprising:
(i) receiving information at a first of said plurality of routers from each of the other routers, said information comprising the total number of hops from each of the other routers to the bandwidth source, the total number of clients connected to each of the other routers, the requested throughput of each client connected to each of the other routers, and the number of hops between the first router and each of the other routers;
(ii) calculating a contention window for said first router based on the received information; and
(iii) setting the delay for a retransmission of data by the first router to the calculated contention window, wherein the retransmission of data follows an unsuccessful transmission of said data.

2. A method according to claim 1, wherein said calculated contention window is inversely related to the distance between the first router and the bandwidth source.

3. A method according to claim 2, wherein the closer the first router is to the bandwidth source, the fewer the number of hops between the first router and the bandwidth source.

4. A method according to claim 1, wherein the contention window is inversely proportional to $\beta_{i,k+1}$, where $\beta_{i,k+1}$ is given by $$\beta_{i,k+1} = \frac{B_{i,k+1}}{B_0} = \frac{\sum_{m=k+1}^{L}(m+1)\sum_{i=1}^{n_{i,m}}\lfloor G_{mi}, B_o \rfloor}{B_o}$$

wherein:
m is the number of hops away from the first router;
L is the total number of hops in the network;
k+1 is the number of hops the first router is from the bandwidth source in the network;
i is the client number;
$n_{i,m}$ is the total number of clients at m hops away;
$G_{m,i}$ is the requested throughput by client i at m hops away; and
$B_0$ is the throughput at a client.

5. A method according to claim 4, wherein the contention window is given by $CW_{i,k+1}$, which is represented as:

$$CW_{i,k+1} = \frac{CW_o + 1}{\beta_{i,k+1}} - 1$$

wherein $CW_0$ is the minimum contention window for each of the clients.

6. A method according to claim 1, wherein the contention window is periodically recalculated.

7. A method according to claim 1, wherein the clients use a different contention window to the calculated contention window, and wherein the contention window used by the clients is fixed.

8. A method according to claim 1, wherein the network is a multihop mesh network.

9. A wireless network comprising a plurality of nodes, said nodes comprising a plurality of routers and at least one client connected to each of said routers, the network further comprising a bandwidth source, wherein the first router is adapted to:
  receive information from each of the other routers, said information comprising the total number of hops from each of the other routers to the bandwidth source, the total number of clients connected to each of the other routers, the requested throughput of each client connected to each of the other routers, and the number of hops between the first router and each of the other routers;
  calculate a contention window for said first router based on the received information; and
  set the delay for a retransmission of data by the first router to the calculated contention window, wherein the retransmission of data follows an unsuccessful transmission of said data.

* * * * *